United States Patent
Bene et al.

(10) Patent No.: US 10,533,108 B2
(45) Date of Patent: Jan. 14, 2020

(54) USE OF ESTERS AS COALESCING AGENT

(71) Applicant: Cognis IP Management GmbH, Düsseldorf (DE)

(72) Inventors: Peter Bene, Cologne (DE); Harald Frommelius, Köln (DE); Heinz-Günther Schulte, Kaarst (DE); Annemarie Meinhold, Hilden (DE); Edda Bergmann, Niederkassel (DE)

(73) Assignee: Cognis IP Management GmbH, Düsseldorf (DE)

( * ) Notice: Subject to any disclaimer, the term of this patent is extended or adjusted under 35 U.S.C. 154(b) by 0 days.

(21) Appl. No.: 15/230,126

(22) Filed: Aug. 5, 2016

(65) Prior Publication Data

US 2017/0015846 A1    Jan. 19, 2017

Related U.S. Application Data

(63) Continuation of application No. 12/598,505, filed as application No. PCT/EP2008/003294 on Apr. 24, 2008, now abandoned.

(30) Foreign Application Priority Data

May 3, 2007    (DE) ........................ 10 2007 021 139

(51) Int. Cl.
| | |
|---|---|
| *C08K 5/10* | (2006.01) |
| *C09D 133/10* | (2006.01) |
| *C09D 125/14* | (2006.01) |
| *C09D 133/08* | (2006.01) |
| *C08K 5/101* | (2006.01) |

(52) U.S. Cl.
CPC ......... *C09D 125/14* (2013.01); *C09D 133/08* (2013.01); *C09D 133/10* (2013.01); *C08K 5/101* (2013.01)

(58) Field of Classification Search
None
See application file for complete search history.

(56) References Cited

U.S. PATENT DOCUMENTS

| | | |
|---|---|---|
| 3,399,158 A | 8/1968 | Huitson |
| 4,043,984 A | 8/1977 | Keil et al. |
| 4,141,864 A | 2/1979 | Rijke et al. |
| 4,489,188 A | 12/1984 | Jones et al. |
| 4,894,406 A | 1/1990 | Smith et al. |
| 5,756,569 A | 5/1998 | Carver et al. |
| 6,762,230 B2 | 7/2004 | Brandenburger et al. |
| 7,160,945 B1 | 1/2007 | Van De Mark et al. |
| 2004/0039095 A1* | 2/2004 | Van de Mark ........... C09D 7/47 524/315 |
| 2005/0182168 A1 | 8/2005 | Bloom et al. |
| 2007/0093579 A1 | 4/2007 | Van de Mark et al. |

FOREIGN PATENT DOCUMENTS

| | | |
|---|---|---|
| DE | 2449471 A1 | 4/1975 |
| DE | 2443645 A1 | 4/1976 |
| EP | 0 026 982 A1 | 4/1981 |
| EP | 0 069 839 A1 | 1/1983 |
| EP | 0 501 614 A2 | 9/1992 |
| EP | 0 599 478 A1 | 6/1994 |
| EP | 1 169 397 A1 | 1/2002 |
| WO | WO-00/56823 A1 | 9/2000 |

OTHER PUBLICATIONS

Bonhorst, C.W., et al., "Esters of Naturally Occurring Fatty Acids—Physical Properties of Methyl, Propyl, and Isopropyl Esters of $C_6$ to $C_{18}$ Saturated Fatty Acids," *Industrial & Engineering Chemistry*, 1948, vol. 40, No. 12, pp. 2379-2384.
Van Leeuwen, B, "Zum Filmbildungsmechanismus von Polymerdispersionen," *Farbe+ Lack*, 1995, vol. 101, No. 7, pp. 606-609.
International Search Report for International Patent Application No. PCT/EP2008/003294, dated Aug. 1, 2008.

* cited by examiner

*Primary Examiner* — Yun Qian
(74) *Attorney, Agent, or Firm* — Marshall, Gerstein & Borun LLP

(57) ABSTRACT

Esters of general formula $R^1$—$COOR^2$, where $R^1$=9 to 23 C alkyl and $R^2$=methyl, ethyl, n-propyl or i-propyl are suitable as coalescing agents, in particular for the production of all types of coatings from an aqueous polymer or latex dispersion.

10 Claims, No Drawings

USE OF ESTERS AS COALESCING AGENT

CROSS-REFERENCE TO RELATED APPLICATIONS

This is a continuation of the U.S. patent application Ser. No. 12/598,505, which is the U.S. national phase of International Application No. PCT/EP2008/003294, filed Apr. 24, 2008, which claims the benefit of German Patent Application No. 10 2007 021 139.4, filed May 3, 2007.

FIELD OF THE INVENTION

The invention relates to the use of esters of the general formula $R^1$—$COOR^2$, in which $R^1$ is an alkyl radical having 9 to 23 C atoms and $R^2$ is a saturated alkyl radical selected from the group of methyl, ethyl, n-propyl, and isopropyl, as coalescents, in particular for the preparation of coating materials.

BACKGROUND OF THE INVENTION

Coalescents (also called film-forming assistants) are known per se. They are added to aqueous coating materials and bring about filming of dispersed polymer particles to form a homogeneous coating film. Adding them is required when the film-forming temperature of the binder is above the temperature of the application.

Known film-forming assistants include the following: ethylene glycol ethyl ether, ethylene glycol propyl ether, ethylene glycol butyl ether, ethylene glycol hexyl ether, diethylene glycol methyl ether, diethylene glycol ethyl ether, diethylene glycol butyl ether, diethylene glycol hexyl ether, propylene glycol n-butyl ether, dipropylene glycol n-butyl ether, dipropylene glycol methyl ether, tripropylene glycol methyl ether, propylene glycol phenyl ether, propylene glycol tert-butyl ether, 2,2,4-trimethyl-1,3-pentanediol monoisobutyrate, and 2,2,4-trimethyl-1,3-pentanediol diisobutyrate (compare "Farbe+Lack", 101 (July 1995), pp. 606-609).

In recent times, for environmental reasons, water-based coatings have become very topical. In latex coatings, based in particular on small particles of synthetic polymers such as polyacrylates, coalescents have traditionally been used in substantial quantities. These coalescents (also called filming assistants) are added to the coatings in order to improve film formation. The function derives from the plasticizing effect exerted by the coalescent on the latex particles, enabling them to coalesce and form a continuous film. This film has optimum properties after the evaporation of the water. Important in the formation of a film is the temperature known as the film-forming temperature, at which (or below which) the polymer particles coalesce to form a film. The customary coalescents lower the film-forming temperature of the polymer.

Conventional coalescents are certain esters and ethers; known technical standards are the hydroxyl ester "Texanol" from Eastman (also often called TMB; a 2,2,4-trimethyl-1, 3-pentanediol monoisobutyrate), and also "EGBE" from Union Carbide (ethylene glycol monobutyl ether).

DE 24 43 645 was published back in 1976. Explicitly disclosed therein is benzoic acid 1,2-propanediol monoester, albeit specifically in connection with amino resins. The claims are directed to "modified amino resins" which comprise compounds of the aryl-COO—X—OH type as modifiers.

U.S. Pat. No. 3,399,158 discloses diesters of $C_{2\text{-}6}$ dicarboxylic acids.

U.S. Pat. No. 4,489,188 was granted in 1984. Coalescents for coatings that are disclosed therein are adducts of EO and PO with aromatic carboxylic acids such as benzoic acid.

U.S. Pat. No. 4,894,406 from 1988 discloses 2-alkyl-1, 3-hexanediol alkyl esters, i.e., special hydroxyl esters, as coalescents.

U.S. Pat. No. 5,756,569 from 1996 discloses 3-alkoxy-propionates as coalescents.

EP 069,839 B1 claims the use of hydroxyl ester mixtures as flow control assistants for aqueous polymer dispersions. The compounds are those obtainable by reacting propylene oxide with aliphatic $C_{7\text{-}12}$ monocarboxylic acids.

So-called reactive coalescents were mentioned at an early stage, as for example in U.S. Pat. No. 4,141,864. Dicyclopentenyloxyethyl methacrylate was used therein, but was said to have odor-related drawbacks.

According to EP 599,478 A1, acetoacetates can be used as a reactive coalescent.

EP 501,614 A2 from 1991 cites esters of ketocarboxylic acids as coalescents.

The claims of European patent EP 1,169,397 B1 are directed to film-forming compositions where polymers or prepolymers are emulsified in aqueous phase and where the composition comprises a coalescent which is an ester and is characterized by the formula R—COOX. R and X in this formula are hydrocarbyl groups or substituted hydrocarbyl groups. At least one of the two radicals must comprise at least two C=C double bonds.

US 2005/0182168 A1 discloses a combination of glycol esters of vegetable oil-based fatty acids and antioxidants. Propylene glycol monoesters are a specific topic therein.

WO 00/56823 discloses film-forming compositions having an aqueous phase and a dispersed phase, the latter comprising a polymer and a coalescent. The latter is an ester subject to the structural proviso that the acid component and/or the alcohol component must comprise at least two C=C double bonds. The technical purpose of this multiplicity of double bonds is that the coalescent itself is reactively crosslinked; it is referred to as a reactive coalescent.

Claim 1 of U.S. Pat. No. 6,762,230 B2 is directed to coating compositions comprising a latex polymer and a coalescent of the formula $R^1$—$(CO$—$X_r$—$O)_n$—$R^2$. In this formula, $R^1$ is an organic group, X is a divalent organic group, the index r can be 0 or 1, the index n can be in the range from 1 to 10, and $R^2$ is hydrogen or an organic group. Where r adopts a value of 0 and n a value of 1, and where the radicals $R^1$ and $R^2$ are alkyl radicals, the stated formula circumscribes fatty acid esters. It is pointed out, however, that fatty acid esters are not specifically disclosed in U.S. Pat. No. 6,762,230 B2. Instead, the coalescents of U.S. Pat. No. 6,762,230 B2 that are specifically discussed are not fatty acid esters.

Fatty acid alkyl esters are referred to in the two following texts: in EP 026,982 A1 from 1980, aqueous coating compositions with a polymer and a coalescent are claimed. The latter is to be selected from a trio of "kinds" of esters; one of these kinds is characterized by the formula $R^1$—$COOR^2$. In this formula, $R^1$ is an alkyl or aryl group and $R^2$ is an alkyl group (bar methyl). In the paragraph bridging pages 11 and 12 it is explicitly stated that in the abovementioned ester formula it is preferably the case that $R^1$=$C_{3\text{-}7}$, and $R^2$=$C_{4\text{-}8}$ (both radicals aliphatic). At page 13 lines 10-33, suitable esters are listed by name. At page 13 line 35 et seqq. it is expressly stated that methyl and esters are generally to be avoided on account of their instability (tendency toward hydrolysis) in paint systems. Here, then, the skilled person is explicitly advised against using, as coalescents, esters whose alcohol component is methanol or ethanol, and is implicitly advised against using, as coalescents, esters whose alcohol component has 3 or 4 C atoms (since, in the preferred embodiment, as mentioned above, $R^2$ embraces a range of 4-8 C atoms). In particular there is no specific disclosure of any fatty acid esters whose alcohol component has 1 to 3 C atoms.

DE 24,49,471 A1 from 1974 claims esters of straight-chain $C_{2-6}$ fatty acids, the alcohol component of the esters being aliphatic $C_{3-4}$ alcohols, as solvents for coating materials. There is no reference there to coalescents.

DETAILED DESCRIPTION OF PREFERRED EMBODIMENTS

There is a constant need for new coalescents. An object of the present invention was therefore to provide coalescents. These coalescents ought to be suitable in particular for producing coatings such as paints, inks, and the like, but also for adhesives. A particularly preferred field for the use of the coalescents to be provided is that of the emulsion paints.

The concept of coalescents (in the literature also called filming assistants or film-forming assistants) is to be understood in the sense which is set out above and which is very well known to the skilled person.

It is expressly stated that the coalescents to be developed in accordance with the invention are intended particularly for use in aqueous dispersions of polymers or latex particles that are suitable for coating purposes of any kind (for example, for water-based paints and inks).

Dispersions of this kind, which are prepared typically by emulsion polymerization and which—in addition to water, the auxiliaries used in emulsion polymerization, and the particles of polymer or of latex—may comprise further constituents which are commonly used for a particularly desired coating purpose, are customarily applied to the surface to be coated; this is followed by evaporation of the water, and, finally, it is essential that the polymer particles or latex particles merge by flowing and form a homogeneous film. This process of film formation requires that at least a minimum temperature be observed, which is referred to by the skilled person as the minimum film-forming temperature (MFFT). Where the MFFT of a system is, for example, 20° C., this means that film formation proceeds successfully only when the temperature is 20° C. or higher. If, on the other hand, film formation is to be produced at lower temperatures, as for example at 10° C. or temperatures even lower, then the stated aqueous dispersions must be admixed with a coalescent in an amount such that the MFFT is lowered to the desired level.

In this respect the present invention has made it a goal in particular to develop coalescents which lower as effectively as possible the MFFT of aqueous dispersions of polymer particles or latex particles that are intended for any coating purposes.

The invention provides for the use of esters of the general formula (I)

in which
$R^1$ is an alkyl radical having 9 to 23 C atoms and
$R^2$ is a saturated alkyl radical selected from the group of methyl, ethyl, n-propyl, and isopropyl
as coalescents.

The radical $R^1$ may be linear or branched, saturated or monoolefinically unsaturated. Preferably the radical $R^1$ is a saturated alkyl radical.

Preferably the esters of the formula (I) are suitable for producing coatings such as paints, inks, and the like, but also for adhesives.

In one embodiment the esters of the formula (I) are used as coalescents in the production of coatings of any kind based on aqueous polymer dispersions or latex dispersions.

A particularly preferred field for the use of the esters (I) as coalescents is that of (water-based) emulsion paints.

Examples of suitable fatty acids contemplated as the acid component of the esters (I) are for instance:

Decanoic acid (capric acid), undecanoic acid, dodecanoic acid (lauric acid), tridecanoic acid, tetradecanoic acid (myristic acid), pentadec anoic acid, hexadecanoic acid (palmitic acid), heptadecanoic acid, and octadecanoic acid (stearic acid), isostearic acid, nonadecanoic acid, eicosanoic acid (arachidic acid), and dodecanoic acid (behenic acid). These fatty acids are among the saturated fatty acids. In the context of the present invention they are used preferably as acid components of the esters (I).

10-Undecenoic acid, lauroleic acid, myristoleic acid, palmitoleic acid, petroselinic acid, oleic acid, elaidic acid, gadoleic acid, erucic acid, and brassidic acid. These fatty acids are among the unsaturated fatty acids, comprising a C=C double bond.

As far as the acid component is concerned, the esters (I) derive preferably from fatty acids having 10 to 18 C atoms. These acids may be linear or branched, saturated or monoolefinically unsaturated. Fatty acids of natural origin are preferred.

In one embodiment, as far as the acid component is concerned, the esters (I) derive from linear, monoolefinically unsaturated fatty acids.

In one embodiment, as far as the acid component is concerned, the esters (I) derive from branched, saturated fatty acids.

In one embodiment, as far as the acid component is concerned, the esters (I) derive from linear, saturated fatty acids.

In one embodiment, esters (I) used in the context of the present invention are methyl esters, in other words compounds characterized by the general formula (I-a)

in which $R^1$ is a saturated alkyl radical having 9 to 18 C atoms. In this case, methyl laurate, methyl myristate, and methyl palmitate, or mixtures thereof (of the kind present, in particular, when the compounds (I-a) are prepared using natural raw materials, in particular based on vegetable triglycerides) are especially preferred.

In one embodiment, esters (I) used in the context of the present invention are isopropyl esters, in other words compounds characterized by the general formula (I-b)

in which $R^1$ is a saturated alkyl radical having 9 to 18 C atoms.

In this case, isopropyl laurate, isopropyl myristate, and isopropyl palmitate, or mixtures thereof, are especially preferred.

The esters (I) are very efficient as coalescents, as is apparent from their outstanding capacity to lower the minimum film-forming temperature (MFFT) of aqueous polymer dispersions. Moreover, coatings (films) obtainable using aqueous polymer dispersions comprising the ester (I) for use in accordance with the invention, after four weeks of storage, are in general significantly harder, and hence more robust and less susceptible to soiling, than those produced using commercial coalescents. A further advantage of the esters (I) for use in accordance with the invention is that their boiling point is above 250° C., which is classified, in accordance with the EU regulations 1999/42/EC and 2004/42, as "VOC-free".

Also of interest are studies by the applicant into the tendency of the esters (I) of the invention toward hydrolysis, in comparison to esters which are structurally close to them, and/or in comparison to commercial, hydroxyl ester-based coalescents. Thus the applicant has found that, in an aqueous-alkaline medium, methyl laurate and isopropyl laurate have a lower tendency toward hydrolysis than butyl laurate and the commercial 2,2,4-trimethyl-1,3-pentanediol monoisobutyrate (TMB). The results of these studies by the applicant are surprising and may be seen as the overcoming of a technical prejudice (compare EP 026,982 A1, treated above).

The esters (I) for use in accordance with the invention can be used in pure form or in the form of mixtures with one another. If desired, the esters (I) can also be used in combination with known coalescents.

The invention further provides, accordingly, for the use of compositions comprising (1) one or more of the above-defined esters (I) and (2) one or more further compounds—different from the esters (I)—selected from the group of esters, ethers, and hydroxyl esters, as coalescents, especially in connection with the production of coatings of any kind based on aqueous polymer dispersions or latex dispersions, and preferably in the production of coatings based on emulsion paints.

As already stated, the esters (I) for use in accordance with the invention are employed in particular as coalescents for aqueous dispersions of polymer particles or latex particles that are to be filmed. This is the case when the esters (I) are used either alone (in the form of a pure species or a mixture of different species) or in a blend with other coalescents different from them.

The esters (I) are used in this case preferably (in accordance with the MFFT of the polymer) in amounts of 0.1% to 40% by weight and more particularly 2% to 6% by weight, based on the amount of the polymer particles or latex particles whose minimum film-forming temperature is to be lowered.

From a different viewpoint, the amount of the esters (I) may be based on a completed coating formula which is to be applied to a surface. In this respect, the esters (I) are used preferably (in accordance with the 20 MFFT of the polymer) in amounts of 0.1% to 5% by weight and more particularly 0.5% to 2% by weight, based on the overall coating formula.

The skilled person is able to vary the amount of the esters (I) in accordance with the composition of a specific dispersion or of a specific coating formula, and is able, as and when necessary, to use higher amounts of esters (I), particularly if the system comprises polymers with a high minimum film-forming temperature and/or if the MFFT is to be lowered to very low levels.

As far as the nature of the polymer particles or latex particles present in the aqueous dispersions is concerned, there are no particular restrictions. It is possible, accordingly, to use all of the polymers and copolymers that are known in this connection to the skilled person for coating purposes.

Depending on the desired field of application and/or on the nature of the coating, the aqueous dispersions may, moreover, comprise further adjuvants and additives that are known in this connection to the skilled person.

The esters (I) of the invention may be added to the aqueous dispersions immediately after preparation, which is preferably by emulsion polymerization, or else at a later point in time, such as during the preparation of a coating material, for instance.

The aqueous dispersions comprising ester (I) for use in accordance with the invention may be applied in principle to any desired surfaces, as for example to wood, metal, plastic, glass, paper, concrete, masonry, and renders.

EXAMPLES

| Substances employed | |
|---|---|
| Polymer dispersions | |
| Mowilith LDM 7451 | Aqueous polymer dispersion based on acrylic ester/methacrylic ester/styrene (Celanese) |
| Mowilith LDM 7717 | Aqueous polymer dispersion based on acrylic ester/methacrylic ester (Celanese) |
| Acronal 290D | Aqueous polymer dispersion based on butyl acrylate/styrene (BASF) |
| Acronal S 790 | Aqueous polymer dispersion based on butyl acrylate/styrene (BASF) |
| Lipaton AE 4620 | Aqueous polymer dispersion based on styrene/acrylic ester (Polymer Latex) |
| Mowilith DM 611 | Aqueous polymer dispersion based on styrene/acrylic ester (Celanese) |
| Mowilith DM 2452 | Aqueous polymer dispersion based on VAC/VEOVA/acrylic ester (Celanese) |
| Rhoplex SG 30 | Aqueous polymer dispersion based on acrylic ester (Rohm & Haas) |
| Coalescents | |
| B1 | $C_{12-16}$ Fatty acid methyl ester ($C_{12}$ content approximately 70%) = inventive coalescent |
| V1 | 2,2,4-Trimethyl-1,3-pentanediol monoisobutyrate (TMB) = commercial coalescent |

Preparation and Assessment of the Coatings

The addition of the test coalescent (B1 or V1) to the respective polymer dispersion was made with stirring. After an aging time of 24 hours, the systems were applied to glass plates by doctor blade (wet film thickness 150 pm). After drying had taken place (at 20° C. for about 24 hours), the films were assessed, using a variety of test methods.

The test results are shown in Tables 1 and 2.

Test Methods Used

The minimum film-forming temperature (MFFT) was tested in accordance with DIN 53787.
The Kanig pendulum hardness was tested in accordance with DIN 53157.

TABLE 1

| Polymer dispersion | MFFT (° C.) | | |
|---|---|---|---|
| used | no addition | with 1% B1 | with 2% B1 |
| Mowilith LDM 7451 | 13 | 3 | 0 |
| Mowilith DM 611 | 17 | 7 | 0 |
| Acronal S 790 | 17 | 12 | 0 |
| Mowilith DM 2452 | 11 | 5 | 3 |
| Lipaton AE 4620 | 18 | 9 | 0 |
| Acronal 290 D | 18 | 10 | 0 |

TABLE 2

| | Amount needed for MFFT = 0° C. | | Pendulum hardness | |
|---|---|---|---|---|
| Resin used | B1 | V1 | B1 | V1 |
| Mowilith LDM 7451 | 2% | 2% | 49 | 36 |
| Mowilith LDM 7717 | 3% | 3% | 46 | 28 |
| Acronal 290D | 2% | 3% | 25 | 15 |
| Acronal S 790 | 2% | >3% | 35 | <15 |
| Lipaton AE 4620 | 2% | >3% | 21 | 13 |
| Mowilith DM 611 | 2% | >3% | 25 | <20 |
| Mowilith DM 2452 | 3% | 3% | 11 | 10 |
| Rhoplex SG 30 | 3% | 3% | 15 | 11 |

In Tables 1 and 2:

"amount needed for MFFT=0° C."=amount of coalescent B1 or V1 required, in each case in % by weight, based on the polymer dispersions (in the form as supplied from the manufacturer) to lower the minimum film-forming temperature (MFFT) of the polymer dispersion used to a value of 0° C.

Pendulum hardness=pendulum hardness measured after 4 weeks (with addition of B1 or VI in an amount such as to lower the minimum film-forming temperature of the resin used to a value of 0° C.)

% B1 or V1=the amount of coalescent added to the aqueous polymer dispersion is reported in % by weight, based on the polymer dispersions (in the form as supplied by the manufacturer).

The inventive ester B1 has advantages in a number of respects over one of the industrial standards, namely V1:

As a coalescent it is in some examples equivalent to, but in many cases more efficient than, the standard, as reflected in the fact that it is able more effectively to lower the minimum film-forming temperature (MFFT) of a broad palette of resins.

Moreover, after 4-week storage, the films, in the case where the inventive ester B1 is used, are significantly harder, and hence more robust and less susceptible to soiling, than those produced using the industrial standard V1.

What is claimed is:

1. A method of coalescing a coating or film of an aqueous dispersion of polymer particles or latex particles comprising:
   (a) providing the aqueous dispersion of polymer particles or latex particles, and
   (b) adding a coalescing agent to the aqueous dispersion of polymer particles or latex particles to provide a coating material, wherein the coalescing agent consists of one or more esters o the general formula (I), $$R^1-COOR^2 \qquad (I)$$

in which $R^1$ is a saturated alkyl radical having 9 to 23 carbon atoms and $R^2$ is a saturated alkyl radical selected from the group of methyl, ethyl, n-propyl, and isopropyl,
   wherein the coating composition is free of an ester having a general formula (I), wherein $R^1$, $R^2$, or both contain unsaturation;
   and wherein a coating or film of the coating composition exhibits an increased hardness compared to a coating or film of a second coating composition containing an ester of general formula (I) in which there is unsaturation in $R^1$, $R^2$, or both.

2. The method of claim 1 wherein the coating material contains 0.1% to 5% by weight of the one or more esters of general formula (I).

3. The method of claim 1 wherein the coating material contains 0.5% to 2% by weight of the one or more esters of general formula (I).

4. The method of claim 1 wherein the one or more esters of general formula (I) is the sole coalescing agent in the coating composition.

5. The method of claim 1 wherein $R^2$ is methyl.

6. The method of claim 1 wherein $R^2$ is isopropyl.

7. The method of claim 1 wherein the one or more esters of general formula (I) is an ester of capric acid, undecanoic acid, dodecanoic acid, tridecanoic acid, tetradecanoic acid, pentadecanoic acid, hexadecanoic acid, heptadecanoic acid, octadecanoic acid, isotearic acid, nonadecanoic acid, eicosanoic acid, and docosanoic acid.

8. The method of claim 1 wherein the coalescing agent is selected from the group consisting of methyl laurate, methyl myristate, methyl palmitate, isopropyl laurate, isopropyl myristate, isopropyl palmitate, and mixtures thereof.

9. The method of claim 1 wherein the coating composition is in the form of a paint, ink, or adhesive.

10. The method of claim 1 wherein the coalescing agent comprise $C_{12-16}$ fatty acid methyl ester.

* * * * *